United States Patent [19]

Hau et al.

[11] 4,312,249
[45] Jan. 26, 1982

[54] METHOD OF CONTROL OF AN AUTOMATIC TRANSMISSION AND A PROGNOSTIC CIRCUIT FOR EXECUTION OF THIS METHOD

[75] Inventors: Antonin Hau; Ctirad Pecháček, both of Prague, Czechoslovakia

[73] Assignee: Nauchen Institute po Ortopedia i Travmatologia, Sofia, Bulgaria

[21] Appl. No.: 167,138

[22] Filed: Jul. 9, 1980

[30] Foreign Application Priority Data

Jul. 10, 1979 [CS] Czechoslovakia .................... 4820-79

[51] Int. Cl.³ ............................................. B60K 41/06
[52] U.S. Cl. ..................................... 74/866; 180/336; 324/162; 364/426
[58] Field of Search ................ 180/336; 324/161, 162; 364/426, 431; 74/861, 862, 866

[56] References Cited

U.S. PATENT DOCUMENTS

| | | | |
|---|---|---|---|
| 3,680,410 | 8/1972 | Sumiyoshi et al. | 74/866 |
| 3,702,572 | 11/1972 | Wakamatsu et al. | 74/866 |
| 4,039,061 | 8/1977 | Pruvot et al. | 364/426 |
| 4,073,203 | 2/1978 | Wurst et al. | 74/866 |
| 4,194,418 | 3/1980 | Pecháček et al. | 74/866 |
| 4,198,882 | 4/1980 | Klencke et al. | 74/866 |
| 4,254,671 | 3/1981 | Sauer et al. | 74/866 |
| 4,274,306 | 6/1981 | Yokoi et al. | 74/866 |

Primary Examiner—Joseph F. Peters, Jr.
Assistant Examiner—Donn McGiehan

[57] ABSTRACT

In order to prevent a cyclic repeating of switching of vehicle gears to higher speeds for automatic transmissions at increased running resistances, an electronic control system is provided with a prognostic circuit which predicts the acceleration which can be expected after switching to a higher speed and which allows the switching to higher speeds only if this acceleration is above zero. If an adjusted maximum speed is exceeded, this operation of the prognostic circuit is interrupted.

5 Claims, 2 Drawing Figures

METHOD OF CONTROL OF AN AUTOMATIC TRANSMISSION AND A PROGNOSTIC CIRCUIT FOR EXECUTION OF THIS METHOD

BACKGROUND OF THE INVENTION

The invention relates to a method of controlling an automatic transmission with an electronic control system, and particularly of controlling hydromechanical transmissions and to a prognostic circuit for execution of this method.

All known control systems of this kind are operated in such manner that they determine the speed of the vehicle and the load on the vehicle, generally expressed as the output shaft RPM of the transmission. Then they determine the position of the throttle. If the prior given parameters are achieved, they give instructions to change-over the mechanical stages.

A drawback of this system is that if higher running resistances are encountered, a cyclic switching over of respective adjacent gear stages takes place. This is due to the fact that when running at a lower gear stage, the vehicle is accelerated up to a speed corresponding to the higher gear stage. The higher gear stage however provides for the vehicle a lower torque, which for certain running resistances can cause a deceleration of the vehicle and thus a repeated switching-over of gear stages until the running resistance decreases. These conditions generally prevail in the case of run-out, up grade running or in the case of a manual operation of the driver, i.e. up to a forced switching to a lower gear stage. The cyclic frequency is higher with lower hysteresis between the requirement for switching to a higher or lower gear stage. An increase of this hysteresis, however, makes the optimum selection of the moment of switching difficult.

SUMMARY OF THE INVENTION

It is an object of this invention to provide a method and arrangement for the control of an automatic transmission which would prevent any switching to a higher gear stage if the running resistances would surpass the torque for the respective stage. According to this invention the automatic transmission uses an electronic system to pick-up, as electrical signals, the instantaneous acceleration of the vehicle for the respective speed stage and the actual available torque of the engine. Prior determined constants corresponding to the actual running conditions are taken into consideration, including at least the vehicle mass and the transmission ratios of respective gear stages. All of the above values are used in evaluation circuits to calculate the predicted acceleration after switching on the higher speed stage. The predicted acceleration is compared to determine whether it is larger than or equal to zero. If the calculated acceleration is greater than or equal to zero the command system enables the control system of the gearing to switch to the higher gear stage. The switching to the higher gear stage can be however locked only up to an adjusted maximum allowable engine RPM.

The drawbacks of known electronic control systems for automatic transmissions are eliminated by the prognostic circuit according to this invention. In the system according to the invention the main control system is complemented by a circuit for measuring the instantaneous acceleration of the vehicle. This circuit is connected to one input of a comparator, to the second input of which the output of a multiplier is connected. The first input of the multiplier is connected to the output of a circuit for measuring the available torque. The second input of the multiplier is connected to the output of a memory for constants. The output of the comparator is connected to a first input of a circuit for locking the switching to a higher stage, the second input of which is connected to a circuit for indicating the maximum allowable engine R.P.M. The output of the circuit is connected by the whole prognostic system to the main control system for the gearing.

The prognostic system according to this invention can be arranged so that the main control system of the transmission comprises a microprocessor with a program of operation and a program of the prognostic system. The first input of the microprocessor is connected to the output of a circuit for picking-up the instantaneous vehicle speed. A second input of the microprocessor is connected to the output of a circuit for picking-up the torque. The outputs of the microprocessor are connected to power switches controlling electromagnets executing the change-over.

A main feature of the control system according to this invention is that it comprises a prognostic system which, substantially prior to the supposed command for switching to a higher transmission stage, evaluates the acceleration of the vehicle in the course of running at a switched-on lower transmission stage and, from known conditions of the respective transmission stages predicts the acceleration that would occur after switching to a higher transmission stage, for instance according to the approximate relation $$a_{n+1} = a_n - K_n \cdot F_n$$

where $a_{n+1}$ is the supposed acceleration of the vehicle after switching from the $n^{th}$ stage to the $(n+1)^{st}$ stage, $a_n$ is the instantaneous acceleration prior to switching to the $(n+1)^{st}$ stage, $F_n$ the torque of the vehicle prior to switching to the $(n+1)^{st}$ stage corresponding to acceleration $a_n$ $K_n$ a constant including the vehicle mass, reduced masses of inertia, the respective transmission ratio and other conditions.

So far if the predicted acceleration $a_{n+1} \geq 0$, the prognostic circuit allows the switching from the $n^{th}$ to the $(n+1)^{st}$ stage. So far if $a_{n+1} \leq 0$, the prognostic circuit delays the switching until conditions that $a_{n+1} \geq 0$ are fulfilled or the maximum engine R.P.M. is obtained.

BRIEF DESCRIPTION OF THE DRAWINGS

An exemplary embodiment of the object of this invention is indicated in the attached drawings, where.

DESCRIPTION OF THE PREFERRED EMBODIMENT

Figure 1:
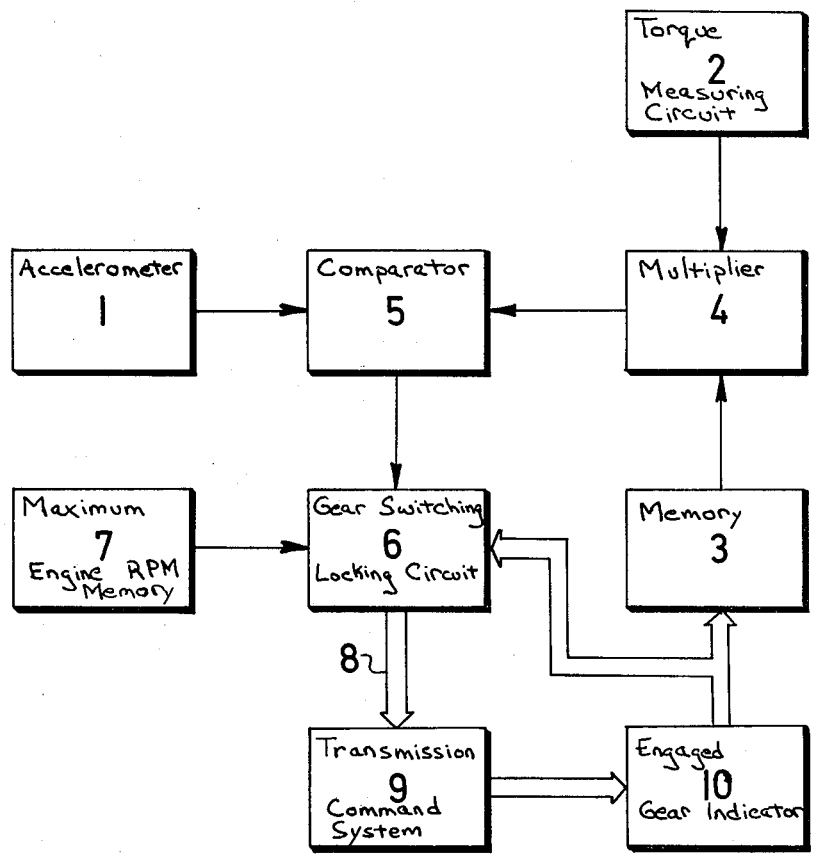
FIG. 1 is a functional block circuit in an analog arrangement.

As shown in FIG. 1 the prognostic system according to this invention comprises a circuit 1 for measuring the instantaneous acceleration of the vehicle, connected to the input or output side of the transmission and connected to the input of a comparator 5. The second input of the comparator is connected to the output of a multiplier 4. The inputs of the multiplier are connected to outputs of a circuit 2 for measuring the delivered torque of the vehicle and of a memory 3 of constants $K_n$. These constants refer to vehicle mass, inertia masses and the respective transmission ratio. The output of the comparator 5, comparing the output information from circuits 1 and 4 is connected to one input of a circuit 6 for locking the switching of the $(n+1)^{th}$ stage if $a_n \leq K_n \cdot F_n$. The output of a circuit 7 indicating the maximum engine R.P.M. at which the function of circuit 6 is eliminated, is connected to a further input of circuit 6. The output 8 of circuit 7 is simultaneously the output of the whole prognostic system and the input to suitable places of the main control or transmission command system 9, to which the input of a circuit 10 is also connected, for indicating the engaged gear. Circuit 10 is part of a feedback path to the memory 3 of constants and to circuit 6.

The described prognostic system operates so that circuit 1 for measuring the acceleration provides information about the instantaneous acceleration $a_n$. The measurement of instantaneous acceleration is based on the speed of the vehicle, derived from output R.P.M. of the transmission. The value of the instantaneous acceleration is compared in the comparator 5 with the output value of the multiplier 4, which is an arithmetic product of the value of the available torque $F_n$ from torque measuring circuit 2 and of the constant $K_n$ from memory 3 corresponding to the vehicle mass, to equivalent inertia masses and to conditions of the $n^{th}$ transmission stage. The selection of the constant $K_n$ from the memory 3 is determined by the engaged gear indicator circuit 10. If the value of acceleration $a_n$ drops below the product $K_n \cdot F_n$, the comparator 5 provides a command for the locking circuit 6 to prevent the transmission from switching to a higher gear stage. The locking function is eliminated if the instantaneous engine R.P.M. surpasses the predetermined maximum engine R.P.M. The circuit 6 receives information about introduction of the respective stage from circuit 10.

Figure 2:
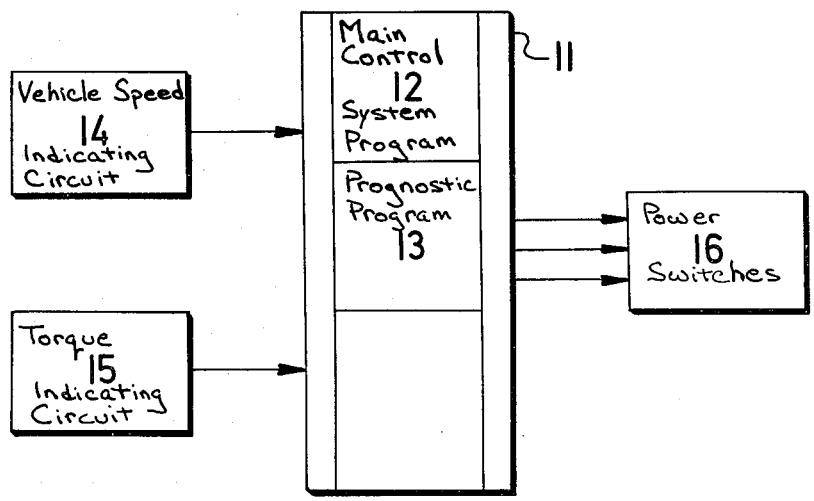
FIG. 2 shows an arrangement using a microprocessor, the program of which realizes the function of the main control system and that of the prognostic system.

The circuit arrangement with the utilization of a microprocessor shown in FIG. 2 comprises a microprocessor 11 with a program 12 of the main control system and a prognostic program 13, where to inputs of the respective circuits information from vehicle speed indicating circuit 14 and from torque indicating circuit 15 are supplied. Outputs from the microprocessor 11 are directly connected to power switches 16.

The main control system of a multistage automatic gearing customarily works with two input values, the vehicle speed, which may be derived from the transmission output R.P.M., and the vehicle load, derived from the position of the throttle. The microprocessor 11 switches the mechanical stages in accordance with main program 12. The information about the vehicle speed from circuit 14 of the microprocessor 11 is easily transformed into the instantaneous acceleration by repeatedly calculated differences of speed values. The information about the torque can be derived in the microprocessor from the position of the throttle or it can be directly obtained as an output from the pulling force indicating circuit 15.

The prognostic program 13 of the microprocessor which secures the operation of the prognostic system comprises:

transformation of the vehicle speed to acceleration provision of the required information about the torque $F_n$, for instance from the throttle position indication of the $n^{th}$ switched on stage selection of the constant $K_n$ corresponding to the $n^{th}$ switched-on stage accomplishment of the multiplication $F_n \cdot K_n$ comparison of the instantaneous acceleration with the value $F_n \cdot K_n$ comparison of instantaneous engine R.P.M. n with maximum engine R.P.M. $n_{max}$ issuing of a command for locking the higher speed stage under conditions that $a_n < K_n \cdot F_n$ and $n < n_{max}$

What is claimed:

1. Method of controlling a vehicles' automatic transmission provided with an electronic control system by preventing the transmission from switching to a next higher gear under certain conditions, comprising the steps of measuring the instantaneous acceleration of the vehicle to provide an acceleration signal, measuring the delivered torque of the engine to the vehicle to provide a torque signal, multiplying the delivered torque signal by a constant related to at least the vehicle mass, inertia masses and the respective transmission ratio of the gear next highest to the engaged gear to provide a product signal, subtracting the acceleration signal from the product signal to provide a predicted acceleration signal, preventing the automatic transmission from switching to the next highest gear in response to a predicted acceleration signal indicating a predicted acceleration less than zero.

2. A process as defined in claim 1 further comprising the steps of measuring the instantaneous engine R.P.M., comparing the measured R.P.M. with a predetermined maximum engine R.P.M., and eliminating the preventing step in response to a measured engine R.P.M. exceeding the predetermined maximum engine R.P.M.

3. An electrical circuit for controlling the switching of gears of a vehicle in an electronically controlled automatic transmission system comprising, accelerometer means for measuring the instantaneous acceleration of the vehicle and for providing a corresponding acceleration signal, torque circuit means for providing a torque signal corresponding to the available delivered torque of the engine, memory means providing a constant related to at least the vehicle mass, inertia masses and the respective transmission ratio of the gear next highest to the engaged gear, means for multiplying said constant from the memory means by said torque signal to provide a product signal, means for subtracting the acceleration signal from the product signal to provide a predicted acceleration signal, locking circuit means responsive to a predicted acceleration signal corresponding to a predicted acceleration less than zero for preventing the transmission from switching to the next highest gear.

4. An electrical circuit as recited in claim 3, further comprising means for measuring the instantaneous engine R.P.M., means for comparing the measured engine R.P.M. with a predetermined maximum engine R.P.M. and for preventing the operation of said locking circuit means in response to an instantaneous engine R.P.M. exceeding the predetermined maximum engine R.P.M.

5. Apparatus for controlling the switching of gears of a vehicle in an electronically controlled automatic transmission system comprising, means for providing an electrical signal corresponding to the instantaneous speed of the vehicle, means for providing a torque signal corresponding to the available delivered torque of the engine, a plurality of power switches for controlling the switching of the automatic transmission to a higher gear, and microprocessor means connecting said speed signal providing means and said torque signal providing means to said power switches for calculating from said speed signal, said torque signal and a constant related to at least the vehicle mass, inertia masses and the respective transmission ratio of the gear next higher to the engaged gear, a predicted acceleration of the vehicle in the next highest gear and for preventing the power switches from switching the transmission to the next highest gear in response to a predicted acceleration less than zero, said calculation being equivalent to converting the speed signal into acceleration and subtracting this acceleration from the product of the torque signal and the constant.

* * * * *